July 13, 1937.　　　O. G. STRINGER　　　2,087,129
RAT TRAP
Filed Feb. 20, 1936　　　2 Sheets-Sheet 1
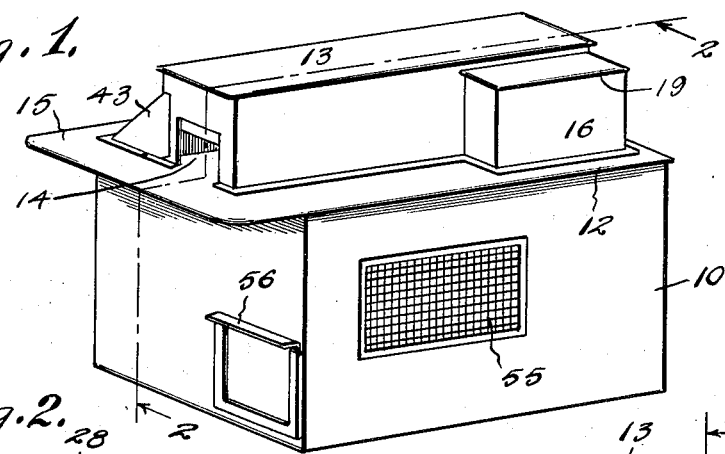
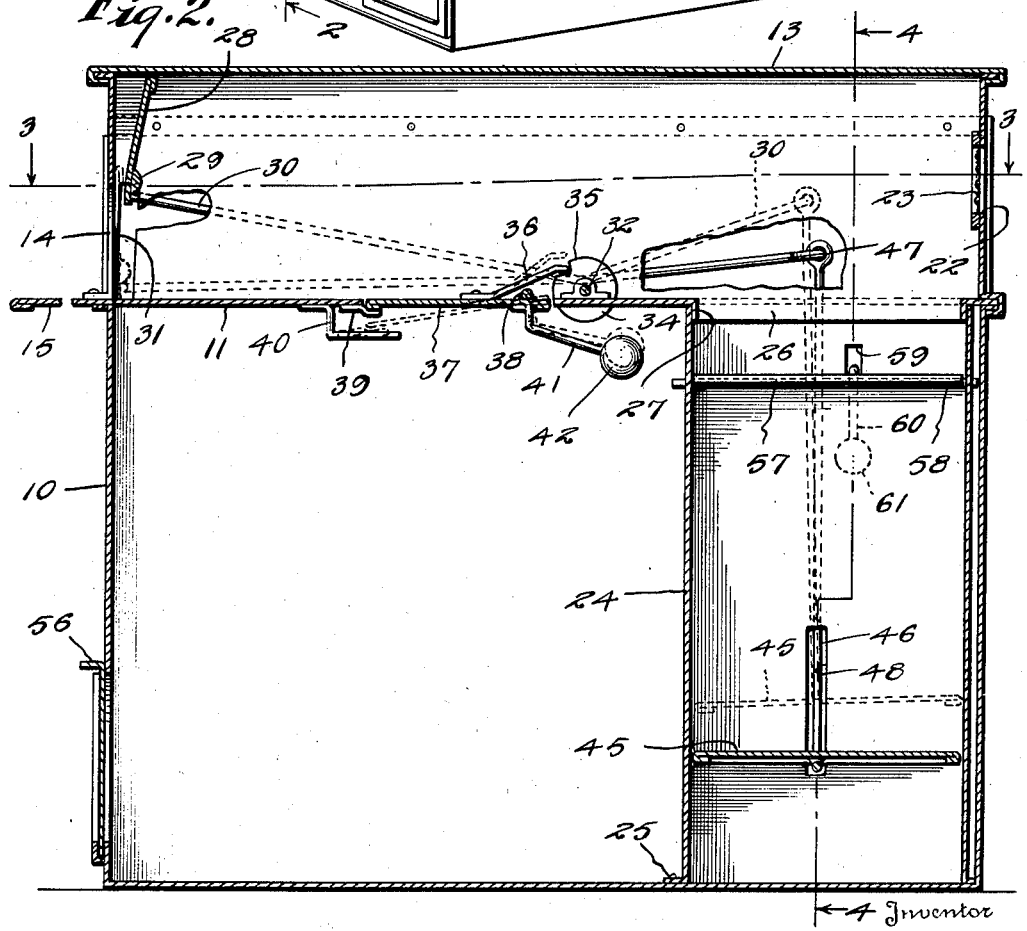
Inventor
O. G. Stringer July 13, 1937.　　　O. G. STRINGER　　　2,087,129

RAT TRAP

Filed Feb. 20, 1936　　　2 Sheets-Sheet 2

Inventor
O. G. Stringer

Patented July 13, 1937

2,087,129

UNITED STATES PATENT OFFICE 2,087,129

RAT TRAP

Olice Gale Stringer, Soso, Miss.

Application February 20, 1936, Serial No. 64,971

6 Claims. (Cl. 43—76)

This invention relates to a trap for catching rats, other rodents or similar animals.

It is aimed to provide a generally improved construction well adapted for manufacture from metal, embodying novel means for closing the trap after entrance of an animal by descent of the animal, the opening of the door and resetting of the trap, and passage of the animal into the captive chamber.

The more specific objects and advantages will become apparent from a consideration of the description following taken in connection with accompanying drawings illustrating an operative embodiment.

In said drawings:—

Figure 1 is a perspective view of the trap;

Figure 2 is a vertical sectional view taken substantially on the line 2—2 of Figure 1;

Figure 3:
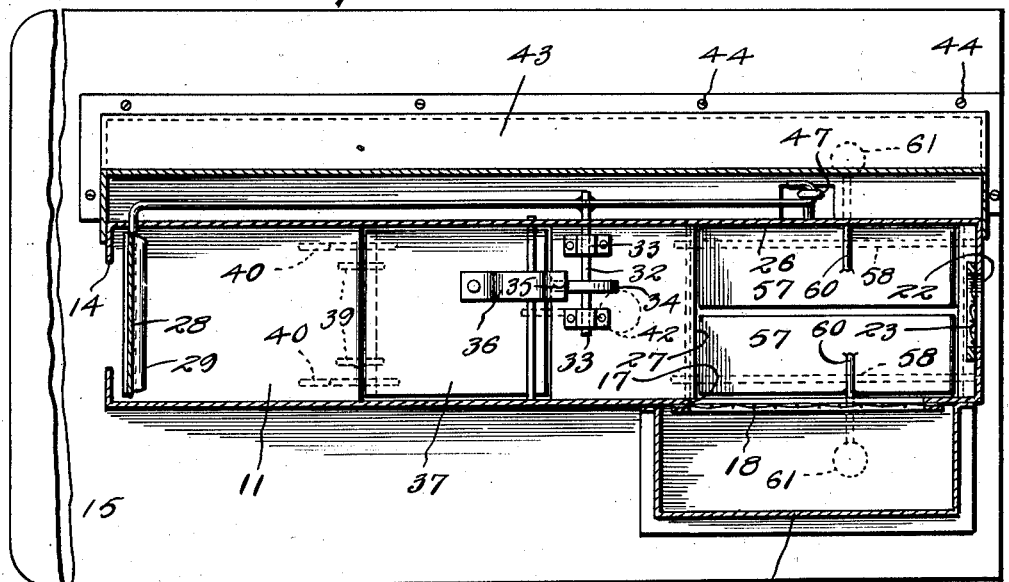
Figure 3 is a horizontal sectional view taken on the line 3—3 of Figure 2.

Referring specifically to the drawings wherein like reference characters designate like or similar parts, 10 designates a metallic box which is closed at the bottom, side and ends and initially opens at the top. A wall 11 is disposed across such top and fastened thereto by clinching flanges together as at 12.

Disposed longitudinally and centrally of such top wall 11 is an entrance housing 13 suitably secured rigidly to the top 11 by welding, soldering, riveting or otherwise. Housing 13 has an entrance opening for the rodents at the front thereof as at 14 and about the same the wall 11 is extended to provide a ledge or shelf 15. Adjacent the rear end of housing 13, it has an outwardly offset chamber 16 to which a suitable gate is adapted to be disposed and which chamber 16 has an opening 17 between the same and housing 13 covered by wire mesh material or grating as at 18. Chamber 16 has a removable closure 19 thereon whose marginal edge is U-shaped as at 20 and has clip engagement with a flange 21 on the chamber.

In the rear end wall of housing 13 an opening 22 is provided which is covered by wire mesh material or grating 23.

Located within the box 10, and arranged substantially centrally thereof and adjacent its rear end, is a chute 24 which may be fastened as at 25 to the bottom wall of the box. It will be noted that the top wall 11 has an opening 26 aligned with the chute and a marginal flange 27 about that opening telescoped into the upper end of the chute.

A closure for the opening 14 may consist of a plate 28 provided with a suitable weight 29 adjacent its lower end which plate is rigidly secured to the forward end of a rod or lever 30 primarily located outside of the housing 13 and parallel thereto, with its forward end portion extending laterally through the adjacent side wall of the housing and enlarged slot 31 therein. A pivot or rod 32 rigid with said lever 30 extends therefrom through one of the side walls of housing 13 and is journalled in bearings 33 secured to the wall 11 within the housing. Intermediate the bearings, said fulcrum rod 32 has a disc 34 rigid thereon which is provided with a notch at 35.

The swinging movement of said lever 30 in closing the door 28 normally is prevented through the engagement of finger 36 in said notch 35. Detent finger 36 extends from a trip-plate 37 mounted in a suitable opening in the top wall 11. Said trip plate adjacent its rear end is pivotally mounted in said opening in the wall 11 by means of a hinge rod 38 secured in the opposite side walls of housing 13. Secured to trip plate 37 are one or more lugs 39 that are adapted to engage the under surface of the top wall 11 to prevent movement of the plate 37 upwardly past the horizontal. Downward movement of said trip plate is limited by a stop 40 fastened on the wall 11. To the rear end of the trip plate 37 an arm 41 is fastened and it carries a terminal weight 42, which normally maintains trip plate 37 horizontal with the element 39 in engagement with wall 11. To cover the lever at 30 and portions outside of the housing 13, a shield 43 is provided which is screwed or bolted in place as at 44.

An actuator plate 45 is located in chute 24 adjacent the bottom thereof and is carried by a rod 46 suitably fastened thereto and pivotally connected at 47 to the rear end of the lever 30. Said rod 46 extends through a vertical elongated slot 48 in one side wall of chute 24.

In the side wall of chute 24 opposite slot 48 is an opening 49 forming an entrance to a decoy chamber 50 having an open bottom, across which a trap door 51 is disposed. Said trap door is pivoted eccentrically by a rod 52 engaging in side walls of the decoy chamber 50 and the trap door 51 is normally held in horizontal position by means of a weighted arm 53, extending interiorly of the chute and adapted to abut one side wall thereof as in Figure 4.

Rodents reaching the trap member 51 will pass it and fall into a captive chamber 54. Captive chamber 54 has an opening in one of the walls thereof covered by wire mesh material or grating 55 and in one of the walls of such chambers, a door or closure is provided for opening from time to time to empty the captive chamber.

Figure 4:
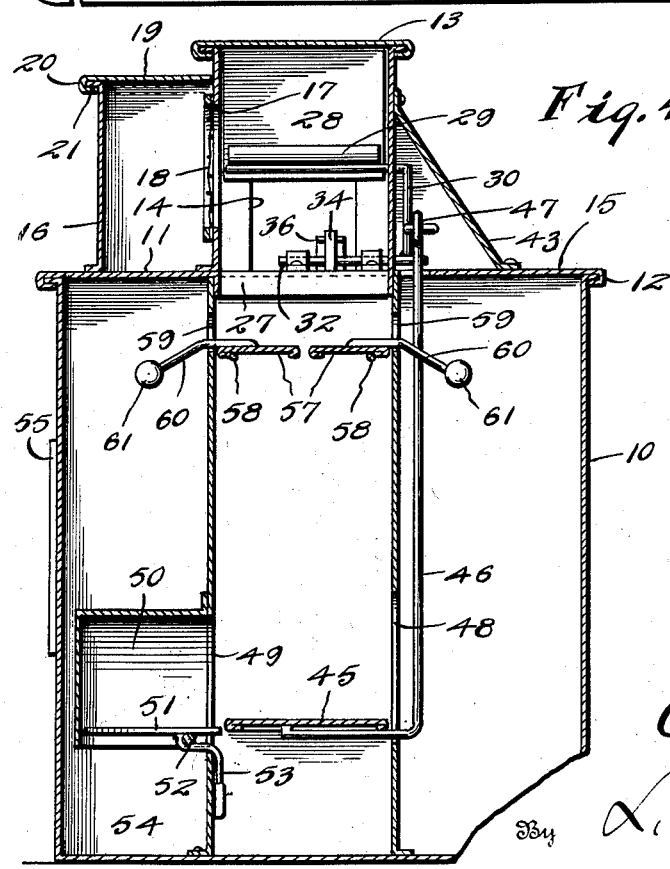
Figure 4 is a vertical sectional view taken on the line 4—4 of Figure 2.

A pair of oppositely movable plates 57 are also provided in the chute adjacent the top thereof, being rigidly connected to rods 58, pivoted at their ends in walls of the chute. The walls of the chute have vertical slots 59 through which arms 60 pass. Arms 60 are fastened to the top plates 57 at one end and at the other ends have weights 61. Thus the weights as shown in Figure 4 normally maintain the plates 57 in horizontal position.

Rodents entering the opening 14, attracted by the bait within the chamber 16 will tread upon the trip plate 37 lowering it thereby the element 36 disengages notch 35 and lever 30 swings under the urgency of weight 29, whereby the door 28 closes the opening 14. The animal seeing the light through the window 23 moves towards that end and jumping on the plates 57 which will lower with his weight, causing it to fall upon the actuator 45 then travel on to the plate 51 and fall into the captive chamber 54. The actuator plate 45 in lowering under the weight of the animal tilts the lever 30 raising the door 28 to open position, turning rod 32 and disc 34 into re-engagement at the notch 35 with the detent 36, thus re-setting the trap automatically.

Various changes may be resorted to provided they fall within the spirit and scope of the invention.

I claim as my invention:—

1. A trap of the class described having a box, a top wall therefor covering an opening therein, a chute within the trap to which said opening leads, a housing above said wall covering having an entrance opening at one end and a window adjacent the other end, a closure for said entrance opening, a lever carrying said closure and normally maintaining it in open position, a pivot rod on said lever, a disc on said pivot rod having a notch, the top wall having a trip plate therein movable under the weight of an animal and having a detent normally engaging said notch to maintain the lever in door-opening position, an actuator plate located in said chute on which the animal is adapted to fall, means for suspending said actuator plate from said lever to cause re-setting of the trap, and means of communication to clean the chute and the interior of the box.

2. A trap of the class described having a box, a top wall therefor covering an opening therein, a chute within the trap to which said opening leads, a housing above said wall covering having an entrance opening at one end and a window adjacent the other end, a closure for said entrance opening, a lever carrying said closure and normally maintaining it in open position, a pivot rod on said lever, a disc on said pivot rod having a notch, the top wall having a trip plate therein movable under the weight of an animal and having a detent normally engaging said notch to maintain the lever in door-opening position, an actuator plate located in said chute on which the animal is adapted to fall, means for suspending said actuator plate from said lever to cause re-setting of the trap, means of communication to clean the chute and the interior of the box comprising a decoy chamber adjacent said actuator plate, and a normally closed trip plate at the bottom thereof upon which the animal is adapted to travel.

3. A trap of the class described having a box, a top wall therefor covering an opening therein, a chute within the trap to which said opening leads, a housing above said wall covering having an entrance opening at one end and a window adjacent the other end, a closure for said entrance opening, a lever carrying said closure and normally maintaining it in open position, a pivot rod on said lever, a disc on said pivot rod having a notch, the top wall having a trip plate therein movable under the weight of an animal and having a detent normally engaging said notch to maintain the lever in door-opening position, an actuator plate located in said chute on which the animal is adapted to fall, means for suspending said actuator plate from said lever to cause re-setting of the trap, means of communication to clean the chute and the interior of the box, said lever being disposed exteriorly of the housing and of the chute and extending through a vertical slot in a wall thereof, and a shield secured to the housing and said top wall about said lever.

4. A trap of the class described having a box, a top wall therefor covering an opening therein, a chute within the trap to which said opening leads, a housing above said wall covering having an entrance opening at one end and a window adjacent the other end, a closure for said entrance opening, a lever carrying said closure and normally maintaining it in open position, a pivot rod on said lever, a disc on said pivot rod having a notch, the top wall having a trip plate therein movable under the weight of an animal and having a detent normally engaging said notch to maintain the lever in door-opening position, an actuator plate located in said chute on which the animal is adapted to fall, means for suspending said actuator plate from said lever to cause re-setting of the trap, means of communication to clean the chute and the interior of the box, said housing having an offset bait chamber adjacent the rear thereof, and said top wall being extended about the entrance of the housing to form a ledge.

5. A trap of the class described having a box, a top wall therefor covering an opening therein, a chute within the trap to which said opening leads, a housing above said wall covering having an entrance opening at one end and a window adjacent the other end, a closure for said entrance opening, a lever carrying said closure and normally maintaining it in open position, a pivot rod on said lever, a disc on said pivot rod having a notch, the top wall having a trip plate therein movable under the weight of an animal and having a detent normally engaging said notch to maintain the lever in door-opening position, an actuator plate located in said chute on which the animal is adapted to fall, means for suspending said actuator plate from said lever to cause re-setting of the trap, means of communication to clean the chute and the interior of the box, a weight for maintaining the trip plate in alignment with the top wall, means on the trip plate to abut the top wall in said aligned position, and stop means on the top plate to limit the depression of the trip plate.

6. A trap of the class described having a box, a top wall therefor covering an opening therein, a chute within the trap to which said opening leads, a housing above said wall covering having an entrance opening at one end and a window adjacent the other end, a closure for said entrance opening, a lever carrying said closure and normally maintaining it in open position, a pivot rod on said lever, a disc on said pivot rod having a notch, the top wall having a trip plate therein movable under the weight of an animal and having a detent normally engaging said notch to maintain the lever in door-opening position, an actuator plate located in said chute on which the animal is adapted to fall, means for suspending said actuator plate from said lever to cause re-setting of the trap, means of communication to clean the chute and the interior of the box, a pair of trip plates in the chute adjacent the top thereof, a decoy chamber offset from the chute and communicating therewith adjacent the actuator plate, and a trip plate in the bottom of said decoy chamber and located approximately to the lowermost portion of the actuator plate.

OLICE GALE STRINGER.